(12) United States Patent
Cooper

(10) Patent No.: US 6,912,202 B1
(45) Date of Patent: Jun. 28, 2005

(54) ARRANGEMENT FOR TESTING NETWORK SWITCH EXPANSION PORT USING EXTERNAL LOGIC TO EMULATE CONNECTED EXPANSION PORT

(75) Inventor: Melissa D. Cooper, Mountain View, CA (US)

(73) Assignee: Advanced Micro Device, Inc., Sunnyvale, CA (US)

( * ) Notice: Subject to any disclaimer, the term of this patent is extended or adjusted under 35 U.S.C. 154(b) by 785 days.

(21) Appl. No.: 09/768,242

(22) Filed: Jan. 25, 2001

(51) Int. Cl.[7] ................................................. H04L 1/14
(52) U.S. Cl. ....................... 370/248; 370/244; 370/249; 370/252; 370/253
(58) Field of Search ................................ 370/242, 243, 370/244, 245, 246, 247, 248, 249, 250, 251, 252, 253, 241, 389, 429, 280, 328, 403, 422, 396; 324/102; 714/25, 28, 32, 718, 728, 719, 733, 736; 709/228, 238; 716/18; 375/355; 702/117

(56) References Cited

U.S. PATENT DOCUMENTS

| | | | | |
|---|---|---|---|---|
| 3,585,500 A | * | 6/1971 | Grubel | 324/102 |
| 3,764,995 A | * | 10/1973 | Helf et al. | 714/32 |
| 4,760,330 A | * | 7/1988 | Lias, Jr. | 714/32 |
| 4,817,093 A | * | 3/1989 | Jacobs et al. | 714/728 |
| 5,383,177 A | * | 1/1995 | Tateishi | 370/250 |
| 5,410,551 A | * | 4/1995 | Edwards et al. | 714/736 |
| 5,425,017 A | * | 6/1995 | Copley et al. | 370/245 |
| 5,477,531 A | * | 12/1995 | McKee et al. | 370/249 |
| 5,586,111 A | * | 12/1996 | Wise | 370/241 |
| 5,721,728 A | * | 2/1998 | Fowler et al. | 370/250 |
| 5,953,335 A | | 9/1999 | Erimli et al. | |
| 6,023,455 A | * | 2/2000 | Takahashi | 370/249 |
| 6,028,845 A | * | 2/2000 | Serikawa et al. | 370/249 |
| 6,345,371 B1 | * | 2/2002 | Lam | 714/719 |
| 6,347,395 B1 | * | 2/2002 | Payne et al. | 716/18 |
| 6,404,740 B1 | * | 6/2002 | Yoshida | 370/241.1 |
| 6,424,658 B1 | * | 7/2002 | Mathur | 370/429 |
| 6,463,037 B1 | * | 10/2002 | Ooyoshi et al. | 370/242 |
| 6,490,694 B1 | * | 12/2002 | Fenton et al. | 714/25 |
| 6,493,647 B1 | * | 12/2002 | Chiang et al. | 702/117 |
| 6,507,564 B1 | * | 1/2003 | Merchant | 370/244 |
| 6,675,335 B1 | * | 1/2004 | Chiang et al. | 714/733 |
| 6,816,465 B1 | * | 11/2004 | Barsoum et al. | 370/252 |
| 2002/0062461 A1 | * | 5/2002 | Nee et al. | 714/28 |
| 2002/0101867 A1 | * | 8/2002 | O'Callaghan et al. | 370/389 |
| 2004/0030970 A1 | * | 2/2004 | Chen et al. | 714/718 |

* cited by examiner

*Primary Examiner*—Phirin Sam
*Assistant Examiner*—Anthony Ton
(74) *Attorney, Agent, or Firm*—Manelli Denison & Selter PLLC; Leon R. Turkevich

(57) ABSTRACT

A network switch chip having an expansion port configured for transferring data according to a prescribed bus protocol is tested using an external logic unit (e.g., a field programmable gate array) configured to emulate a connected expansion port. The external logic unit is configured for receiving an expansion port frame from the expansion port via an expansion bus, generating a new expansion port frame, and outputting the new expansion port frame to the expansion port via the expansion bus. Hence, a test engineer can validate the expansion port of the network switch chip by detecting the reception of the new expansion port frame by the expansion port. Hence, the expansion port of the network switch chip can be tested without the necessity of a second network switch chip.

17 Claims, 2 Drawing Sheets

ARRANGEMENT FOR TESTING NETWORK SWITCH EXPANSION PORT USING EXTERNAL LOGIC TO EMULATE CONNECTED EXPANSION PORT

BACKGROUND OF THE INVENTION

1. Field of the Invention

The present invention relates to the testing of network devices such as integrated network switches configured for switching data packets between subnetworks.

2. Background Art

Local area networks use a network cable or other media to link stations on the network. Each local area network architecture uses a media access control (MAC) enabling network interface devices at each network node to access the network medium.

Switched local area networks such as Ethernet (IEEE 802.3) based systems are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes. Hence, network switch designers and test engineers need to be able to minimize the time and expense needed to evaluate designs during prototyping of Ethernet-based network systems.

One problem associated with testing network-based switch chips involves the limited availability of the sample chips for testing hardware associated with interaction between multiple chips. For example, the network switch disclosed in U.S. Pat. No. 5,953,335 describes an expansion port that may be used for interconnecting multiple network switch chips for transfer of packet data according to a prescribed bus protocol, such as peripheral component interconnect (PCI) bus protocol. However, use of the expansion port assumes the availability of at least one additional network switch chip for interconnection of the expansion ports of the respective network switch chips.

Hence, there is a concern that the expansion port and associated operations cannot be tested or validated if only one network switch chip is available for testing. In addition, even if a second network switch chip was available for testing of the expansion ports, a detected error between the expansion port operations creates the additional problem of determining whether the detected error is due to a problem in the first switch chip under test, a problem in the second switch chip used for testing the expansion port of first switch chip, a problem in the connection between the two expansion ports, or any combination of the foregoing.

SUMMARY OF THE INVENTION

There is a need for an arrangement that enables an expansion port of a network switch chip, configured for transferring data according to a prescribed bus protocol, to be tested and evaluated without the necessity of a second switch chip.

This and other needs are attained by the present invention, where a network switch chip having an expansion port configured for transferring data according to a prescribed bus protocol is tested using an external logic unit configured to emulate a connected expansion port The external logic unit is configured for receiving an expansion port frame from the expansion port via an expansion bus, generating a new expansion port frame, and outputting the new expansion port frame to the expansion port via the expansion bus. Hence, a test engineer can validate the expansion port of the network switch chip by detecting the reception of the new expansion port frame by the expansion port. Hence, the expansion port of the network switch chip can be tested without the necessity of a second network switch chip.

One aspect of the present invention provides a method for testing a network switch chip having an expansion port configured for transferring data according to a prescribed protocol. The method includes receiving by an external logic unit an expansion port frame from the expansion port via an expansion bus. The method also includes generating by the external logic unit a new expansion port frame based on reception of the expansion port frame, and outputting the new expansion port frame onto the expansion bus for reception by the expansion port of the network switch chip.

Another aspect of the present invention provides a test system configured for testing a network switch chip having an expansion port configured for transferring data according to a prescribed protocol. The test system includes an expansion port bus configured for propagation of the expansion port frame output by the expansion port, and an external logic unit. The external logic unit is configured for generating a new expansion port frame based on reception of the expansion port frame, and outputting the new expansion port frame onto the expansion bus for reception by the expansion port of the network switch chip. Hence, the expansion port of the network switch chip can be tested without the necessity of a second switch chip having a corresponding expansion port.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
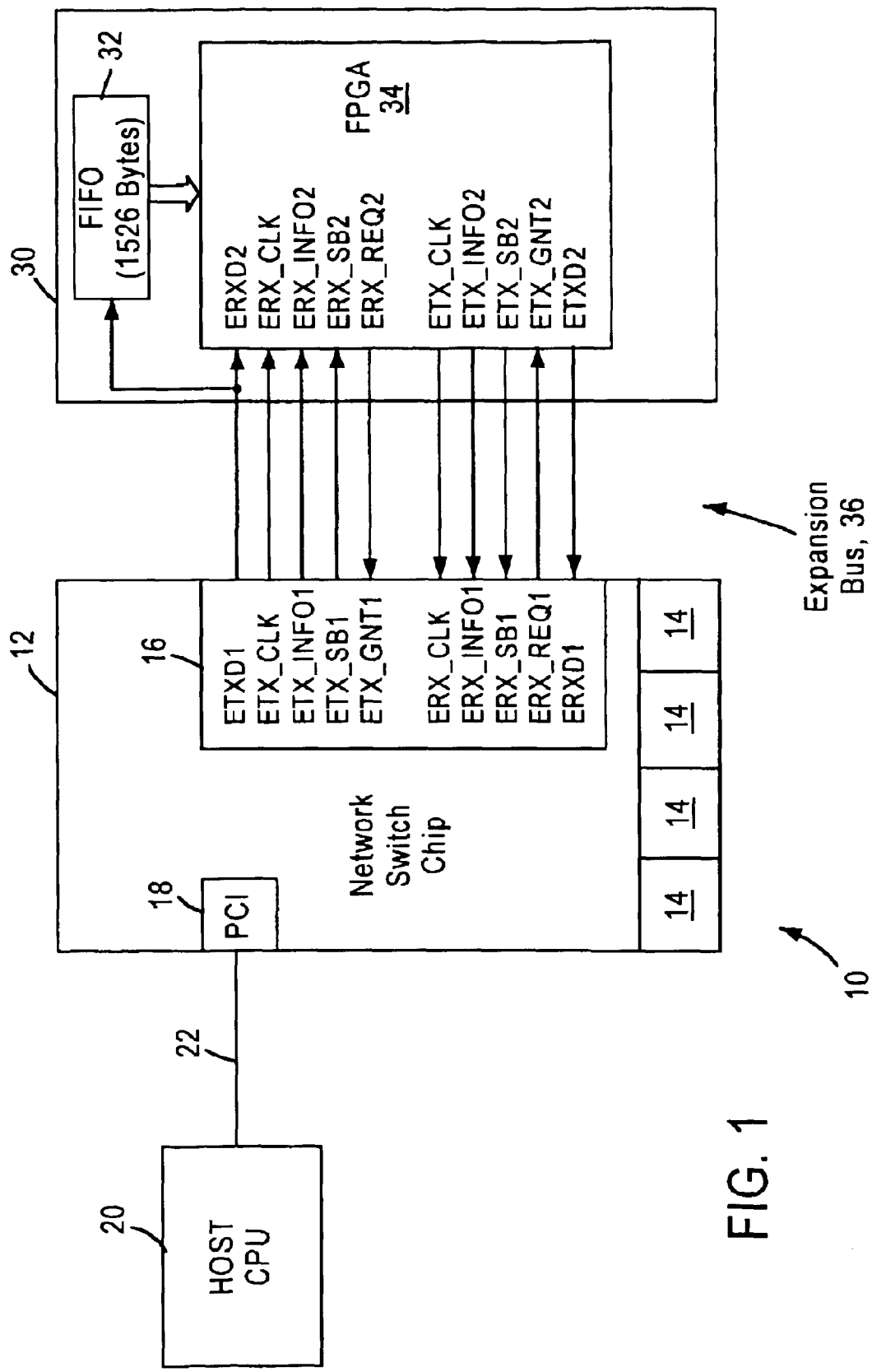
FIG. 1 is a block diagram of a system configured for testing an expansion port of a network switch chip according to an embodiment of the present invention.

FIG. 1 is a block diagram illustrating a testing system 10 configured for testing a network switch chip 12, for example an integrated network switch as illustrated in U.S. Pat. No. 5,953,335, according to an embodiment of the present invention. In particular, the network switch chip 12 includes network switch ports 14 configured for sending and receiving data frames according to a prescribed network protocol, such as IEEE 802.3-based Media Independent Interface (MII) protocol. The network switch 12 also includes an expansion port 16 configured for transferring expansion port frames 40, illustrated in FIG. 2, between other switch chips via an expansion bus 36 and the respective switch ports according to a prescribed protocol, for example burst-based bus protocol. The network switch chip 12 also includes a peripheral component interconnect (PCI) interface 18, enabling a host CPU 20 to configure and control the network switch chip 12 via a PCI bus 22. Hence, a test engineer can configure the network switch chip 12 to output prescribed expansion port frames 40 onto an expansion bus 36, and to read any expansion port frames received by the expansion port 16 from the expansion bus 36.

According to the disclosed embodiment, the test system 10 includes a converter 30 configured for receiving an expansion port frame, modifying the received expansion port frame into a new expansion port frame, and outputting the new expansion port frame back onto the expansion bus 36 for reception by the expansion port 16. Hence, a test engineer using the host CPU 20 can validate the performance of the expansion port 16 by outputting a prescribed expansion port frame onto the expansion bus 36, determining whether the expansion port 16 has received a new expansion port frame from the expansion bus 36, and comparing the differences between the output expansion port frame and the new expansion port frame relative to the changes made by the converter 30.

The converter 30, implemented for example using a PC board, includes a first in first out (FIFO) buffer 32 and an external logic unit 34, implemented as a field programmable gate array (FPGA). The FIFO buffer 32 is configured for storing at least one maximum sized expansion port frame (e.g., 1526 bytes).

Figure 2:
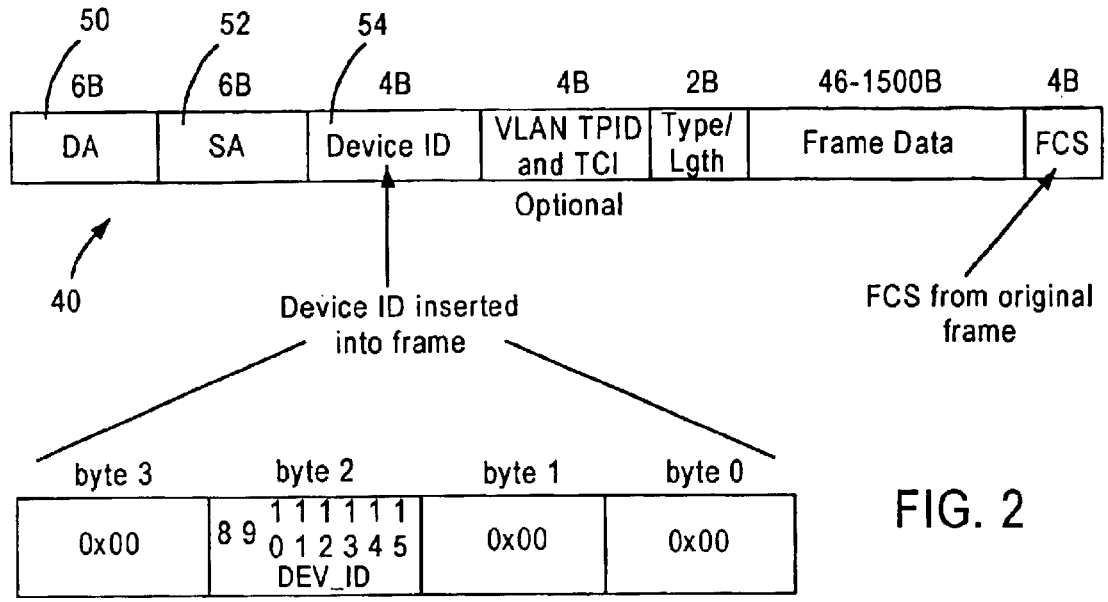
FIG. 2 is a diagram illustrating an expansion port frame.
Figure 3:
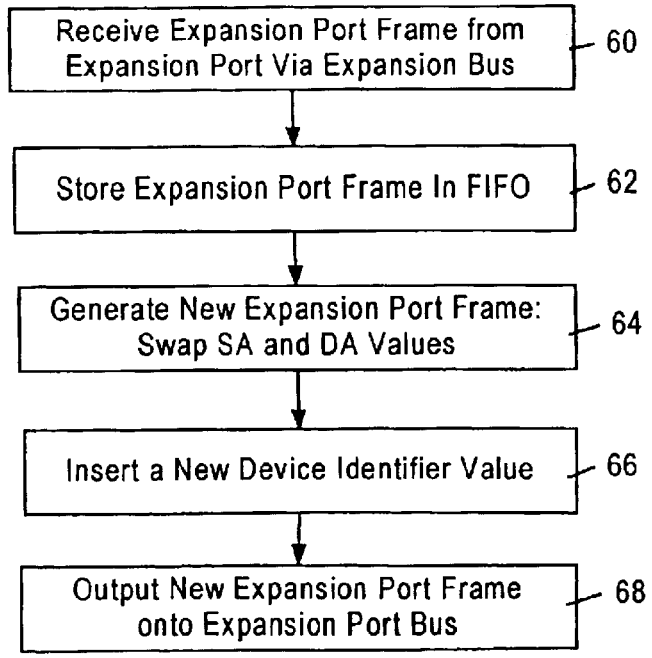
FIG. 3 is a diagram illustrating a method of testing the expansion port of the network switch chip using a field programmable gate array, according to an embodiment of the present invention.

FIG. 3 is a diagram illustrating the method of testing the network switch chip according to an embodiment of the present invention. The method begins in step 60, where the converter 30 receives the expansion port frame as burst traffic and stores in step 62 the burst traffic (as an expansion port frame) in the FIFO 32. In particular, data is transferred over the expansion bus 36 on the expansion port transmit data path (ETXD1) in bursts of eight clock (ETX_CLK= ERX_CLK) cycles; the data includes start and end of frame information as well as frame data. As shown in FIG. 2, the expansion port frame 40 includes a destination address field 50 storing a destination address value (DA), a source address field 52 storing a source address value (SA), and device ID field 54 for identifying the network switch chip 12 having output the expansion port frame 40.

The FPGA 34 asserts the expansion port receiver request signal (ERX_REQ2) until detecting that the FIFO 32 is full. Hence, the expansion port 16 continues to transmit data so long as the expansion port receiver request (ETX_REQ2) signal (i.e., the expansion port transmit grant (ETX_GNT1) input) is asserted by the FPGA 34; in other words, the expansion port 16 continues to transmit data as long as the expansion port transmit grant (ETX_GNT1) input is asserted. Control information, such as start and stop markers that correspond to data, is supplied by the expansion port 16 on the expansion port control data lines (ETX_INFO1, ERX_INFO2). The expansion port transmit start of burst (ETX_SB1) is used by the expansion port 16 to indicate to the FPGA 34 on the expansion port receive start of burst (ERX_SB2) input that valid data will be presented on the expansion port transmit data (ETXD1) path for a burst of eight clock cycles.

Once a full expansion port frame 52 has been stored in the expansion port FIFO 32, the FPGA 34 generates the new expansion port frame by changing data within the received expansion port frame stored in the expansion port FIFO 32. In particular, the FPGA 34 swaps (i.e., inserts) in step 64 the destination address and source address values into the source address field 52 and destination address field 50, respectively, creating the appearance that the destination network node is sending acknowledgment back to the source of the data packet. The FPGA 34 also inserts in step 66 a new device identifier value, different from the existing device identifier value, into the device identifier field 54.

The FPGA 34 then outputs in step 68 the new expansion port frame onto the expansion port bus 36 for reception by the expansion port 16. In particular, the FPGA 34 waits until the expansion port receiver request signal (ETX_REQ1) is asserted by the expansion port 16. The FPGA 34 continues to transmit data so long as the expansion port receiver request (ETX_REQ1) signal (i.e., the expansion port transmit grant (ETX_GNT2) input) is asserted by the expansion port 16. Control information, such as start and stop markers that correspond to data, is supplied by the FPGA 34 on the expansion port control data lines (ETX_INFO2, ERX_INFO1). The expansion port transmit start of burst (ETX_SB2) is used by the FPGA 34 to indicate to the expansion port 16 on the expansion port receive start of burst (ERX_SB1) input that valid data will be presented on the expansion port transmit data (ETXD2) path for a burst of eight clock cycles (ETX_CLK and ERX_CLK).

According to the disclosed embodiment, an expansion port of a network switch chip is tested using an FPGA configured for generating a new expansion port frame based on changing data within a received expansion port frame, enabling a test engineer to validate the expansion port based on reception of the new expansion port frame from the expansion bus. Hence, the expansion port of a network switch chip can be validated without the necessity of another switch chip interconnected by an expansion bus.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for testing a network switch chip having an expansion port configured for transferring data according to a prescribed protocol, the method comprising:

receiving by an external logic unit an expansion port frame from the expansion port via an expansion bus;

generating by the external logic unit a new expansion port frame based on reception of the expansion port frame; and outputting the new expansion port frame onto the expansion bus for reception by the expansion port of the network switch chip;

wherein the receiving of the expansion port frame includes:

asserting by the external logic unit an expansion port receiver request signal, on a corresponding signal path of the expansion bus, to enable the expansion port of the network switch chip to output the expansion port frame onto a single expansion port transmit data path of the expansion bus, the external logic unit asserting the expansion port receiver request signal until detecting a buffer of the external logic unit has been filled; and storing into the buffer, during assertion of the expansion port receiver request signal, frame data of the expansion port frame received in prescribed bursts via the single expansion port transmit data path based on a first clock signal received from the expansion port via a corresponding first clock path of the expansion bus.

2. The method of claim 1, wherein the generating step includes changing data within the received expansion port frame to generate the new expansion port frame.

3. The method of claim 2, wherein the changing step includes:

parsing a header of the expansion port frame to retrieve a source address value from a source address field and a destination address value from a destination address field;

inserting the source address value into the destination address field, and the destination address value into the source address field, of the new expansion port frame.

4. The method of claim 3, wherein the changing step further includes inserting a new device identifier value, different from a value of an existing device identifier value in the received expansion port frame, into a device identifier field in the new expansion port frame.

5. The method of claim 4, wherein the external logic unit is implemented using a field programmable gate array.

6. The method of claim 1, wherein the external logic unit is implemented using a field programmable gate array.

7. The method of claim 1, wherein the outputting of the new expansion port frame includes:

receiving by the external logic unit a second expansion port receiver request signal from the expansion port via a corresponding signal path of the expansion bus; and outputting second frame data, in response to receiving the second expansion port receiver request signal, in prescribed bursts via a single expansion port receive data path of the expansion bus, according to a second clock signal output by the external logic unit onto a corresponding second clock path of the expansion bus.

8. The method of claim 7, wherein the step of outputting second frame data includes outputting, onto a corresponding signal path of the expansion bus, a start of burst signal indicating the single expansion port receive data path carries a corresponding burst of valid data.

9. The method of claims 8, wherein the receiving of the expansion port frame further includes receiving, from a corresponding signal path of the expansion bus, a second start of burst signal indicating the single expansion port transmit data path carries a corresponding burst of valid data.

10. A test system for testing a network switch chip having an expansion port configured for transferring data according to a prescribed protocol, the system comprising:

an expansion port bus configured for propagation of the expansion port frame having been output by the expansion port;

an external logic unit configured for generating a new expansion port frame based on reception of the expansion port frame, and outputting the new expansion port frame onto the expansion bus for reception by the expansion port of the network switch chip; and a buffer, wherein;

the external logic unit is configured for asserting an expansion port receiver request signal, on a corresponding signal path of the expansion bus, to enable the expansion port of the network switch chip to output the expansion port frame onto a single expansion port transmit data path of the expansion bus, the external logic unit asserting the expansion port receiver request signal until detecting the buffer has been filled; and the expansion port frame being received, during assertion of the expansion port receiver request signal, as frame data in prescribed bursts via the single expansion port transmit data path based on a first clock signal received from the expansion port via a corresponding first clock path of the expansion bus.

11. The system of claim 10, wherein the external logic unit is configured for generating the new expansion port frame by changing data within the received expansion port frame.

12. The system of claim 11, wherein the external logic unit is configured for changing data by parsing a header of the expansion port frame to retrieve a source address value from a source address field and a destination address value from a destination address field, the external logic unit inserting the source address value into the destination address field, and the destination address value into the source address field, of the new expansion port frame.

13. The system of claim 12, wherein the external logic unit is configured for inserting a new device identifier value into a device identifier field in the new expansion port frame.

14. The system of claim 10, wherein the external logic unit is implemented using a field programmable gate array.

15. The test system of claim 10, wherein the external logic unit, in response to receiving a second expansion port receiver request signal from the expansion port via a corresponding signal path of the expansion bus, is configured for outputting the new expansion port frame as second frame data in prescribed bursts via a single expansion port receive data path of the expansion bus, according to a second clock signal output by the external logic unit onto a corresponding second clock path of the expansion bus.

16. The test system of claim 15, wherein the external logic unit is configured for outputting, onto a corresponding signal path of the expansion bus, a start of burst signal indicating the single expansion port receive data path carries a corresponding burst of valid data.

17. The test system of claim 16, wherein the external logic unit is configured for receiving, from a corresponding signal path of the expansion bus, a second start of burst signal indicating the single expansion port transmit data path carries a corresponding burst of valid data.

* * * * *